3,460,517
ANIMAL FEED DROP LINE CONTROL APPARATUS
Dee D. Allen, Zeeland, Mich., assignor, by mesne assignments, to U.S. Industries, Inc., New York, N.Y., a corporation of Delaware
Filed Dec. 12, 1966, Ser. No. 600,936
Int. Cl. A01k 5/02
U.S. Cl. 119—56                      7 Claims

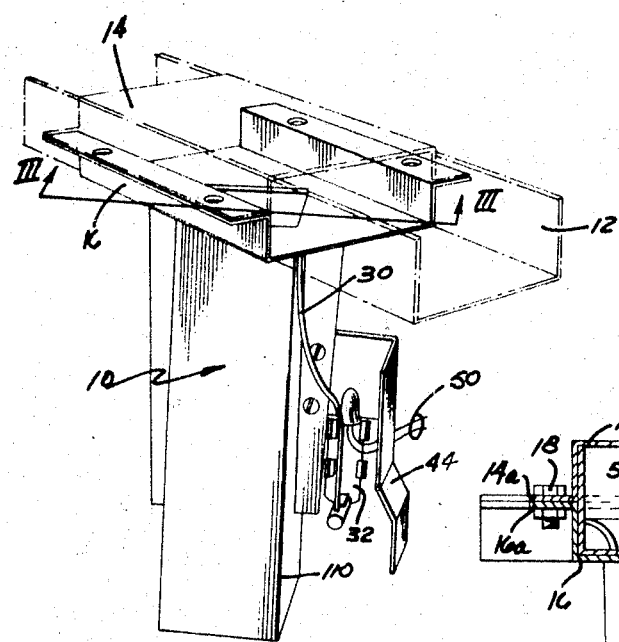
Aug. 12, 1969 — D. D. ALLEN — 3,460,517
ANIMAL FEED DROP LINE CONTROL APPARATUS
Filed Dec. 12, 1966
INVENTOR.
DEE DEXTER ALLEN
BY
ATTORNEYS

United States Patent Office 3,460,517
Patented Aug. 12, 1969

ABSTRACT OF THE DISCLOSURE

A generally tubular throat structure having a pivotally mounted feed-sensing finger therein and a rigid switch-operating element connected to the sensing finger and extending laterally outwardly of the longitudinal silhouette of the throat, with the operating element carrying a magnetic switch actuator and a magnetically-responsive switch mounted to an outside wall of the throat structure, for actuation by the magnet upon predetermined movement of the sensing finger.

---

This invention relates to animal feeding systems of the type having elevated feed distribution lines or troughs equipped with feed drop lines extending downwardly therefrom into feeding receptacles from which the animals eat, and more particularly the invention relates to a control apparatus for use in such a feed drop line.

In the use of animal feeding systems of the type having elevated feed distribution lines or troughs and generally vertical feed drop lines connected to these troughs for carrying feed therefrom downward to the level of the animals it frequently happens that the conveyor member which moves in the overhead distribution lines may bring more feed to the top of the feed drop lines than the animals are actually eating. Consequently, feed begins to back up in the feed drop lines, and in time it may well fill these lines and then back up into the overhead distribution line. This can cause spillage of feed as well as create problems with the conveyor member moving in the latter. Consequently, the need arises for a switching mechanism by which the level of any feed backing up in the feed drop lines may be detected and a signal initiated at a given level, by which the conveyor mechanism in the overhead lines may be stopped. The need for such a switching mechanism is accentuated by the fact that there is no need to run the conveyor when the drop lines are filled, and the drop lines may be kept filled at any or all times by means of the aforesaid switching mechanism. Under these conditions, the conveyor in the overhead distribution lines need run only when required, i.e., when the animals or birds have eaten enough of the feed from the feed drop lines to lower the level of feed therein to a point below the top of such drop lines.

It is a major object of the present invention to provide a very superior control apparatus for use in feed drop lines under the aforesaid circumstances. The present control apparatus provides extremely long life, is subject to little or no mechanical breakdown during usage, is not fouled up by dirt and dust present in the environment in which it is used, and is rugged and uncomplicated in construction, so that it may be economically manufactured and sold.

The foregoing major objects of the invention and the advantages provided thereby, together with other objects and advantages equally a part thereof, will become increasingly apparent following consideration of the ensuing specification and its appended claims, particularly when taken in conjunction with the accompanying illustrative drawings setting forth a preferred embodiment of the invention.

In the drawings:
FIG. 1 is a lateral perspective view of the overall control apparatus, showing in phantom lines a typical feed distribution trough to which the apparatus is mounted in use;
FIG. 2 is an overhead plan view of the control apparatus of FIG. 1, on a considerably reduced scale;
FIG. 3 is a sectional elevation taken through the vertical plane III—III seen in both FIGS. 1 and 2;
FIG. 4 is a fragmentary perspective view showing certain structural details of the apparatus; and
FIG. 5 is a cross-section of the switch means which is a part of the combination forming the apparatus of the invention.

Briefly stated, the present invention provides a control switch apparatus for animal feed drop lines, which apparatus is characterized by a throat structure having sides and a passage defined thereby, and which is connectable into a feed drop line such that feed dropping through the line will drop through the passage in the throat structure. The apparatus includes a sensing element which is mounted in the aforesaid passage to be moved from a first to a second position by feed which is backing up within and filling the passage at the point where the sensing element is mounted. This sensing element includes an operator portion which extends outwardly of the throat structure, and an electrical switching component is mounted externally of the throat structure for switching actuation by the aforesaid operator portion. The switching component is electrically connectable into a circuit controlling the conveyor or other such mechanism supplying feed to the drop line from overhead, such that switching actuation of the said component may change the operation of the circuit and thereby change the operation of the conveyor mechanism, all in response to the filling of said drop line and throat structure passage with feed.

Referring now in more detail to the drawings, the switch construction of the invention will be seen to comprise a throat structure 10 in the form of a generally rectangular or square four-sided, vertically-oriented tube providing a passage therethrough. The throat structure is mountable to an overhead feed distribution line such as the channel-shaped trough 12 seen in FIGS. 1 and 3, preferably by means of upper and lower clamping portions 14 and 16, respectively, which are basically U-shaped or channel-shaped sheet structures having apertured lateral flanges such as 14a and 16a through which bolts 18 may be passed to secure the two clamping portions together around the outside of the trough 12. More specifically, the lower clamping portion 16 is affixed to the top of the tubing section forming the throat structure 10, and has a centrally-located aperture 17 therein which provides flow communication between the similarly apertured feed trough 12 and the passage 11 extending upwardly through the throat structure. The interior dimensions of the lower clamping portion 16 are such that it fits slidably around the bottom of the trough 12, and the upper clamping portion 14 is dimensioned to fit similarly over the top of the trough. The lateral flanges 14a and 16a of the two clamping portions thus meet each other so that the bolts 18 can hold the two clamping portions together around the trough and thereby firmly mount the entire throat structure 10 to the trough 12.

Within the passage 11 inside the throat structure 10, a sensing element 20 is pivotally or swingably mounted, preferably by curved hook-like extensions 21a and 21b (FIG. 4) of the sensing element. These extensions pass over the top of one of the sides 110 forming the throat structure, such that the sensing element is suspended on side 110 but may swing with respect thereto, across the passage 11 in the throat. It will be noted that the element 20 is in the form of a flat blade which extends substantially completely across the width of the passage 11, such that feed dropping through any portion of the passage is likely to touch at least some part of the blade or element 20.

The hook-like extension 21a of the blade 20 is formed such that a resilient biasing element or spring 22 (FIG. 4) may be connected thereto, and the other end of such spring is connected to a flange 24 which is rigidly mounted upon the said side 110 of the throat structure. This arrangement serves to pull downwardly on the bottom edge of the curved extension 21a and thereby continuously urge the blade 20 outward, away from side 110 of the throat and into the passage 11, in the position shown in FIGS. 3 and 4. In this connection, it may be noted that, as shown in FIG. 3, the bottom extremity of the lower clamping portion 16 may have an extending flange 16b which is curved downwardly to project into the aperature 17 formed in this clamping portion and into the passage 11 in the throat structure. Such a curved, extending flange will serve to provide a stop for indexing the sensing blade 11 at a desired position across the passage 11, so that the continuous urging of the biasing spring 22 does not swing the blade 20 completely across the passage and against the side 210 of the throat opposite side 110 thereof, and thereby completely close the passage 11.

The curved extension 21b of the sensing blade 20 has an elongated rod-like operator portion 30 fixedly secured thereto as by welding, such that the operator 30 extends outwardly of the throat structure, i.e., adjacent the outside surface of the side 110. Operator 30 is a generally rigid member and, being rigidly connected to the extension 21b of the sensing blade 20, will swing in the same manner as the blade 20 relative to the side 110 of the throat structure.

An electrical switching component 32 is mounted adjacent side 110 of the throat structure, as for example on a flange 112 extending laterally therefrom. Switch 32 is the "Mercoid" type, having a movable internal electrode 40 which is arranged to move into contact with a small pool of a conducting liquid 41 such as mercury located at the bottom of the switching component whenever a magnetizing force is placed in proximity with the lower portion of the glass envelope forming the outer shell of the component and housing the electrodes and the pool of mercury. This is accomplished as illustrated by FIG. 5 by providing a ferrous or other paramagnetic element 42 secured to electrode 40, which is attracted to magnet 34. A spring element 43 is provided, for biasing electrode 40 out of contact with pool 41 when magnet 34 has been moved away from the glass envelope enclosing the switch parts.

Switching component 32 is switched or actuated by a magnet 34 mounted in a block 36 of plastic or the like secured to the lower portion of the operator 30. That is, when the operator 30 is in the position shown in FIGS. 1 and 4, the switching component 32 will be in what may be referred to as a switched or actuated state due to the close proximity of the magnet 34. However, when the sensing element or blade 20 is pushed toward side 110 of the throat structure, as is shown in phantom in FIG. 3, the operator 30 is swung outwardly of the side 110 and away from the switching component 32, thereby removing the magnetic influence from the switching component and allowing it to assume its opposite switching state. It is to be noted that a protective flange 44 is preferably mounted, as by being connected to the lateral flange 112 of side 110, such that the protective flange extends outwardly and around the switching component 32, to thereby shield it from possible damage or breakage by external objects or implements.

Having fully described the structure and general assembly of the control apparatus of the present invention, its use and operation will likely be apparent. With the throat structure 10 installed upon an elevated feed distribution line or trough in the manner seen in FIG. 3, driving actuation of a conveyor member 50 located within the trough 12 (illustrated as a conveyor chain in FIG. 3) serves to continuously move animal feed throughout the trough 12. When this feed passes over the top of the aperture 17 in the lower clamping portion 16, the feed drops downward into the passage 11 in the throat structure, and by passing therethrough enters a conventional feed drop line (not shown) attached to or in flow communication with the bottom extremity of the throat structure.

As the conveyor member 50 runs over a period of time, the feed dropping into the passage 11 may back up in the drop line connected thereto and in the throat structure, due to the fact that the feed is not removed from the drop line as fast as it is supplied thereto. Normally, the feed falling through the passage merely slides off and over the sensing element 20 which extends across a major portion of the passage. However, when the feed begins to back up into the passage and reaches the bottom of the blade 20, additional feed will gradually pile against the inclined blade.

This exerts an increasing force against the sensing element which pushes it toward, and eventually against, the side 110 of the throat structure. When this occurs, the operator portion 30 is moved in the manner set out above to the position shown in phantom in FIG. 3, in which the switching component 32 assumes an unswitched or deactuated condition which is opposite the condition existing during the time when the sensing element extends outwardly and across the passage in the throat. The aforesaid unswitched or deactuated condition may, for example, be an open circuit in the electrical leads 52 extending into and out of the switching component. Thus, the switching component may be connected into a control circuit (not specifically shown) by which a motor is energized to drive the conveyor member 50, such that when the aforesaid open circuit occurs, the conveyor member is deactivated and ceases to bring additional feed to the drop line in which the throat structure is connected.

In accordance with the foregoing, the conveyor member will be driven to bring feed to any of various drop lines until feed backs up in a given drop line to the point where it reaches the throat structure and presses against the sensing element or blade 20 therewithin. The feed pressing against this element will then cause switching of the switching component and resultant shut-down of the conveyor member. This stops the supply of feed to the throat structure and the drop line connected thereto until such time as enough feed has been removed from the drop line to unload the sensing blade 20, at which time the biasing spring 22 will automatically move the sensing element back out into the passage in the throat, thereby actuating the switching component 32 once again and restarting the conveyor member.

It will be seen that the present apparatus is one which cannot be damaged easily, the combination including the magnetic switch also is not subject to malfunction by reason of dirt, dust, or feed collecting thereon. Therefore, it is dependable which is extremely important.

It is entirely conceivable that upon examining the foregoing disclosure, those skilled in the art may devise particular embodiments of the concepts forming the basis of the invention which differ somewhat from the preferred embodiment shown and described herein, or may make various changes in structural details to the present embodiment. Consequently, it is to be recognized that the preferred embodiment shown and described is for purposes of general illustration only and is in no way intended to illustrate all possible forms of the invention.

I claim:

1. A control apparatus for animal feed drop lines, comprising in combination: a throat structure having sides defining a passage therebetween, said throat structure being connectable to a feed drop line such that feed dropping through said line may drop through said passage; a sensing element mounted upon said throat structure and having at least a part disposed within said passage, to be moved from a first to a second position by feed filling said passage at the point where said element part is disposed; said sensing element including a switch operator portion extending laterally outwardly through the longitudinal silhouette of said throat; and an electrical switching component immovably mounted with respect to a side of said throat for switching actuation by said operator portion; said switching component being electrically connectable to a circuit controlling the supply of feed to said drop line, such that said switching actuation may change the operation of said circuit to affect said feed supply in a desired predetermined manner in response to the filling of said drop line and throat structure passage with feed.

2. The control apparatus of claim 1, wherein said throat structure sides define an opening communicating between said passage and the area without said sides, and wherein said sensing element includes hook-like portions at its upper extremity, said hook-like portions extending through said opening and swingably supporting said element upon an edge of said opening.

3. The control apparatus of claim 2, wherein said switch operator portion comprises an arm rigidly connected to said hook-like portion, said arm extending downwardly along the outside of said throat structure sides.

4. The control apparatus of claim 1, wherein said electrical switching component comprises a magnetically-responsive switch element, and said switch operator portion carries a magnetic device for actuating said switch element.

5. The control apparatus of claim 4, further including a resilient biasing means for steadily urging said sensing element toward said first position.

6. The control apparatus of claim 4, wherein said switching component is of the type having a pool of conductive liquid within a magnetically permeable envelope, and wherein said component has a switching element comprising an electrode which is movable under magnetic influence into contact with said liquid.

7. The control switch construction of claim 6, wherein said envelope is glass and wherein said throat structure further includes a protective flange secured to the outside thereof in a position to at least partially shield said glass envelope to prevent inadvertent breakage thereof.

References Cited

UNITED STATES PATENTS

| | | | |
|---|---|---|---|
| 3,033,163 | 5/1962 | Hostetler et al. | 119—52 |
| 3,197,016 | 7/1965 | Jones | 198—64 |
| 3,230,933 | 1/1966 | Myers et al. | 119—53 |
| 3,302,617 | 2/1967 | Bares et al. | 119—52 |
| 3,325,055 | 6/1967 | Marshall | 222—70 |
| 3,330,255 | 7/1967 | Scott et al. | 119—51.11 |
| 3,349,753 | 10/1967 | Van Huis | 119—52 |

ALDRICH F. MEDBERY, Primary Examiner